US012716577B2

(12) United States Patent
Sellers

(10) Patent No.: US 12,716,577 B2
(45) Date of Patent: Aug. 25, 2026

(54) ILLUMINATION AND SOUND DEVICES AND SYSTEMS FOR BABY GEAR

(71) Applicant: Larry Lemond Sellers, Porter Ranch, CA (US)

(72) Inventor: Larry Lemond Sellers, Porter Ranch, CA (US)

( * ) Notice: Subject to any disclaimer, the term of this patent is extended or adjusted under 35 U.S.C. 154(b) by 0 days.

(21) Appl. No.: 18/989,359

(22) Filed: Dec. 20, 2024

(65) Prior Publication Data

US 2025/0207765 A1 Jun. 26, 2025

Related U.S. Application Data

(60) Provisional application No. 63/612,366, filed on Dec. 20, 2023.

(51) Int. Cl.
*F21V 21/08* (2006.01)
*F21L 4/02* (2006.01)
*F21V 33/00* (2006.01)
*F21W 131/30* (2006.01)
*F21Y 113/00* (2016.01)
*F21Y 115/10* (2016.01)

(52) U.S. Cl.
CPC ................ *F21V 21/08* (2013.01); *F21L 4/02* (2013.01); *F21V 33/0056* (2013.01); *F21W 2131/30* (2013.01); *F21Y 2113/00* (2013.01); *F21Y 2115/10* (2016.08)

(58) Field of Classification Search
CPC ......... F21V 21/08; F21V 33/0056; F21L 4/02
See application file for complete search history.

(56) References Cited

U.S. PATENT DOCUMENTS

| | | | | |
|---|---|---|---|---|
| 8,025,433 | B2 * | 9/2011 | Comrada | B62B 9/005 362/543 |
| 8,763,750 | B1 * | 7/2014 | Berkman | H04R 1/02 181/150 |
| 8,786,189 | B2 * | 7/2014 | Mayfield | H05B 47/19 315/86 |
| 9,004,706 | B1 * | 4/2015 | Banfield | H04R 1/028 362/86 |
| 9,469,254 | B1 * | 10/2016 | White | H04R 1/026 |
| 10,070,210 | B2 * | 9/2018 | Battyanyi | H04R 1/26 |
| 2010/0103664 | A1 * | 4/2010 | Simon | H05B 47/12 362/253 |
| 2016/0295308 | A1 * | 10/2016 | Battyanyi | H04R 1/26 |
| 2018/0224114 | A1 * | 8/2018 | Bian | F21K 9/64 |
| 2019/0020938 | A1 * | 1/2019 | Lee | H04R 9/025 |
| 2019/0341793 | A1 * | 11/2019 | Chien | F21V 33/0004 |

* cited by examiner

*Primary Examiner* — Bryon T Gyllstrom
(74) *Attorney, Agent, or Firm* — NGUYEN TARBET IP LAW

(57) ABSTRACT

Described herein is a multifunctional illumination device specifically designed for secure attachment to strollers or cribs. The system offers a convenient light source for caregivers, eliminating reliance on external lighting or cell phone flashlights while serving as a sensory engagement tool for young children. Functioning similarly to a crib mobile, the system enhances the visual and auditory environment with dynamic lighting and sound, capturing the child's attention during strolls or rest periods. This dual-purpose design improves caregiver convenience and child interaction, creating a more efficient and enjoyable caregiving experience.

13 Claims, 5 Drawing Sheets

ILLUMINATION AND SOUND DEVICES AND SYSTEMS FOR BABY GEAR

CROSS-REFERENCE TO RELATED APPLICATIONS

This application is a non-provisional and claims benefit of U.S. Provisional Application No. 63/612,366 filed Dec. 20, 2023, the specification of which is incorporated herein in its entirety by reference.

FIELD OF THE INVENTION

The present invention features a Bluetooth™ speaker that encompasses a lighting system that is attachable to an infant or child stroller.

BACKGROUND OF THE INVENTION

Strollers and cribs are essential for ensuring the safety and comfort of infants and young children during rest or travel. However, these devices often lack integrated features that enhance the sensory environment for the child or provide practical convenience for caregivers. To address these shortcomings, the present invention introduces a multifunctional illumination device with an integrated Bluetooth™ speaker designed to attach securely to a stroller or crib.

This innovative system not only provides a convenient source of light for caregivers, eliminating the need for a cell phone flashlight or external lighting, but it also serves as a sensory engagement tool for children. Similar to a mobile over a crib, the illumination device described herein is designed to capture the child's attention while enhancing the visual and auditory environment during strolls or rest periods. This dual-purpose functionality improves both convenience and interaction, making caregiving more efficient and enjoyable.

BRIEF SUMMARY OF THE INVENTION

It is an objective of the present invention to provide systems and devices that deliver both illumination and sound for infants and young children while in a stroller or crib, as specified in the independent claims. Embodiments of the invention are given in the dependent claims. Embodiments of the present invention can be freely combined with each other if they are not mutually exclusive.

The system and device described herein (e.g., the Lullaby Light) is a light and speaker system that can be attached to an infant or child stroller. The device provides a multi-color light system with a remote control that also plays music. In some embodiments, the built-in speaker system is Bluetooth™ and can be paired to any electronic device with music apps to play music of your choice, such as lullabies, to soothe their child. The lighting system has multiple color displays and light sequences. The brightness and lights can be controlled by the included remote control. The volume and type of music are controlled by the electronic device that may be paired to the speaker system via Bluetooth™.

In some embodiments, the present invention features an illumination device. In some embodiments, the illumination device comprises a housing component comprising a first side and a second side, a first lighting source disposed on the first side at or near the first end of the housing component, a second lighting source disposed on the first side at or near the second end of the housing component, and a speaker disposed centrally within the housing component, e.g., between the first lighting source and second lighting source. In certain embodiments, the illumination device includes one or more attachment components positioned on the second side of the housing component. Additionally, the illumination device may further include at least one power source operatively connected to the first lighting source, the second lighting source, or the speaker.

In other embodiments, the illumination device comprises a housing component comprising a first side and a second side, a first lighting source disposed on the first side at or near the first end of the housing component, a second lighting source disposed on the first side at or near a second end of the housing component, a speaker disposed centrally within the housing component between the first lighting source and second lighting source, at least one power source operatively coupled to the first lighting source, the second lighting source, and the speaker, and one or more attachment components disposed on the second side of the housing component.

In some embodiments, the first lighting source and the second lighting source comprise light-emitting diodes (LEDs). In certain embodiments, the lighting sources are elongated in shape. Additionally, in some embodiments, the first lighting source and the second lighting source are arranged collinearly. Furthermore, in certain configurations, the first lighting source, the second lighting source, and the speaker are oriented to face the same direction.

In some embodiments, the illumination devices described herein is removably attachable to various types of baby gear, including cribs, bassinets, strollers, wagons or carts, and car seats.

In other embodiments, the present invention may feature an illumination system for baby gear. In some embodiments, the illumination system comprises a baby gear and an illumination device as described herein removably attached to the baby gear.

One of the unique and inventive technical features of the present invention is its integration of a multifunctional lighting and sound system specifically designed for strollers and cribs. Without wishing to limit the invention to any theory or mechanism, it is believed that the technical feature of the present invention advantageously enhances the experience of both infants and caregivers by providing soothing music and dynamic lighting sequences that capture the child's attention while offering practical illumination for the caregiver. None of the presently known prior references or works have the unique, inventive technical feature of the present invention.

Moreover, the prior references teach away from the present invention. For example, existing systems either lack secure attachment mechanisms for strollers or fail to provide both visual and auditory stimulation in a single compact device. The present invention, such as the described "Lullaby Light," addresses these shortcomings with customizable lighting options and multiple colors to engage the child, while also offering caregivers improved visibility for tasks like diaper changes or monitoring during walks.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE SEVERAL VIEWS OF THE DRAWING(S)

The features and advantages of the present invention will become apparent from a consideration of the following detailed description presented in connection with the accompanying drawings in which.

DETAILED DESCRIPTION OF THE INVENTION

Following is a list of elements corresponding to a particular element referred to herein:

100 Illumination Device
110 Housing Component
111 First Side
112 Second Side
113 First End
114 Second End
121 First Lighting Source
122 Second Lighting Source
130 Speaker Unless otherwise explained, all technical and scientific terms used herein have the same meaning as commonly understood by one of ordinary skill in the art to which a disclosed invention belongs. The singular terms "a," "an," and "the" include plural referents unless context clearly indicates otherwise. Similarly, the word "or" is intended to include "and" unless the context clearly indicates otherwise. The term "comprising" means that other elements can also be present in addition to the defined elements presented. The use of "comprising" indicates inclusion rather than limitation. Stated another way, the term "comprising" means "including principally, but not necessary solely". Furthermore, variation of the word "comprising", such as "comprise" and "comprises", have correspondingly the same meanings. In one respect, the technology described herein related to the herein described compositions, methods, and respective component(s) thereof, as essential to the invention, yet open to the inclusion of unspecified elements, essential or not ("comprising").

All publications, patent applications, patents, and other references mentioned herein are incorporated by reference in their entirety for all purposes. In case of conflict, the present specification, including explanations of terms, will control.

Although methods and materials similar or equivalent to those described herein can be used to practice or test the disclosed technology, suitable methods and materials are described below. The materials, methods, and examples are illustrative only and not intended to be limiting.

The present invention is designed for use in an infant or child stroller, offering lighting to enhance visibility for caregivers while checking on a sleeping child, changing diapers, or strolling during both daytime and evening hours. The systems and devices described herein provide practical visual assistance, while the integrated music and lighting features serve as a soothing mechanism during walks or outings. This multifunctional system helps keep the child engaged and comfortable, making it ideal for use in parks, neighborhoods, and other outdoor settings.

Figure 1:
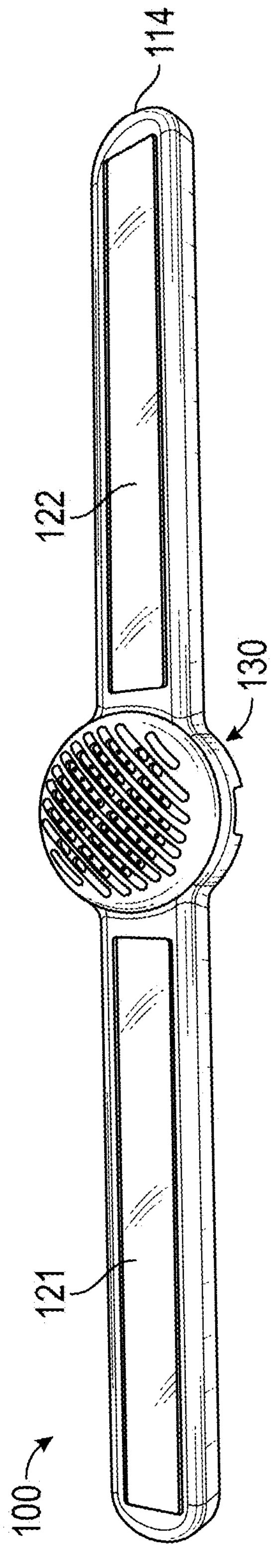
FIG. 1 shows a perspective view of the device described herein.
Figure 2:
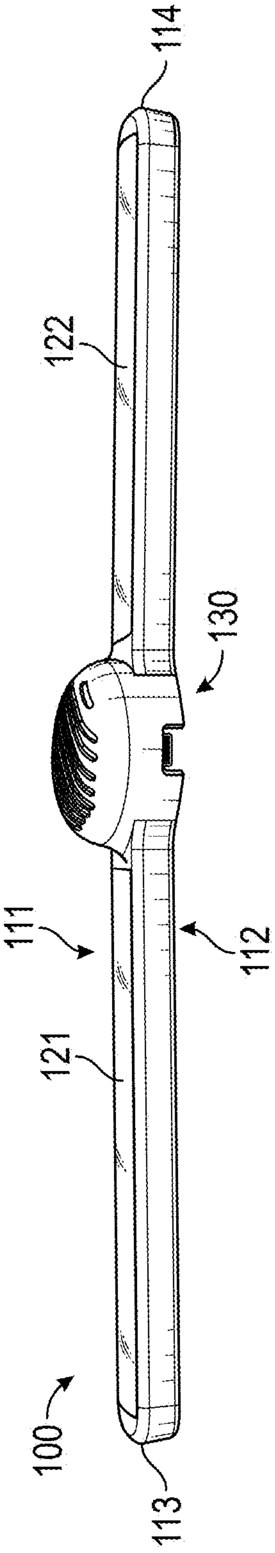
FIG. 2 shows a side view of the device described herein.
Figure 3:
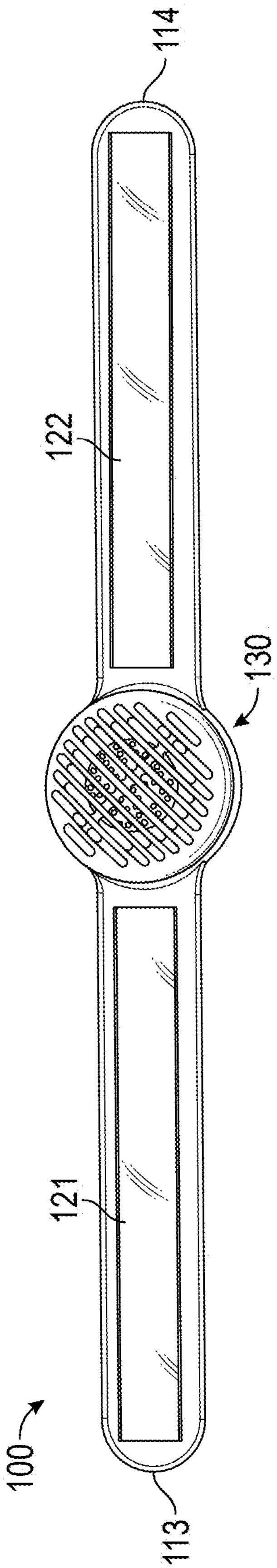
FIG. 3 shows a top view of the device described herein.
Figure 4:
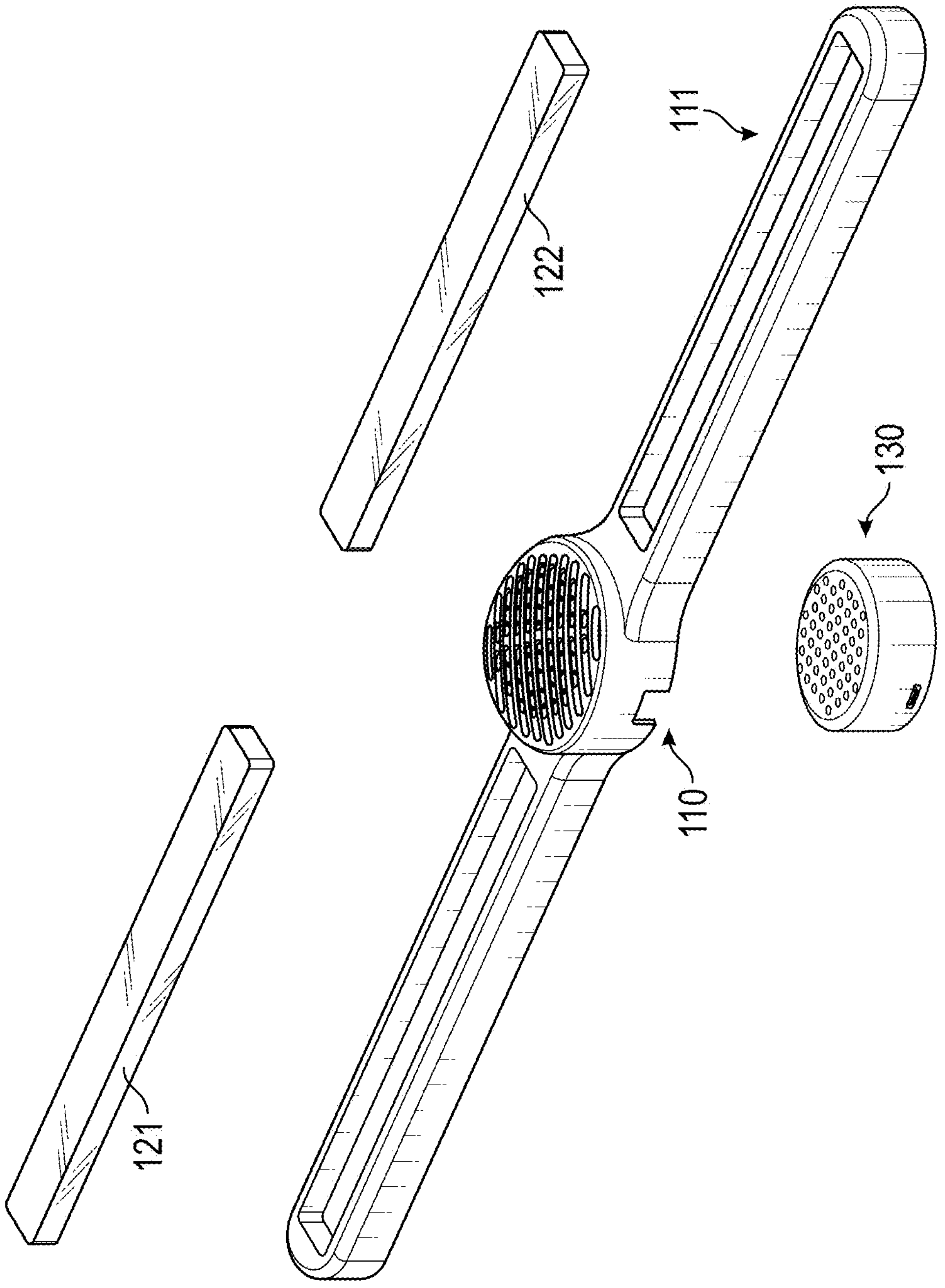
FIG. 4 shows an exploded view of the device described herein.
Figure 5A:
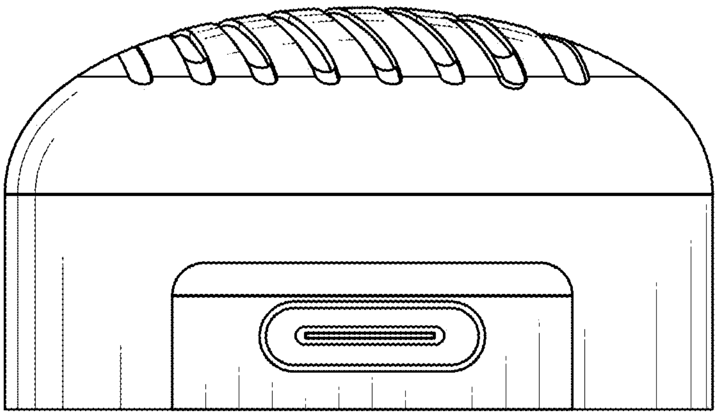
FIGS. 5A and 5B shows a close-up view of the speaker portion of the device.
Figure 5B:
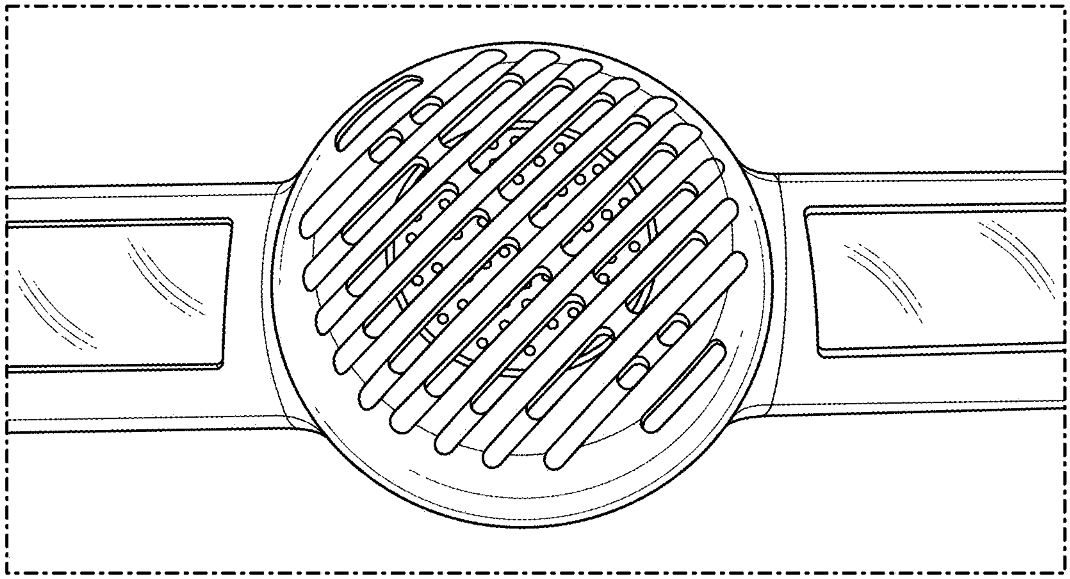
Figure 6A:
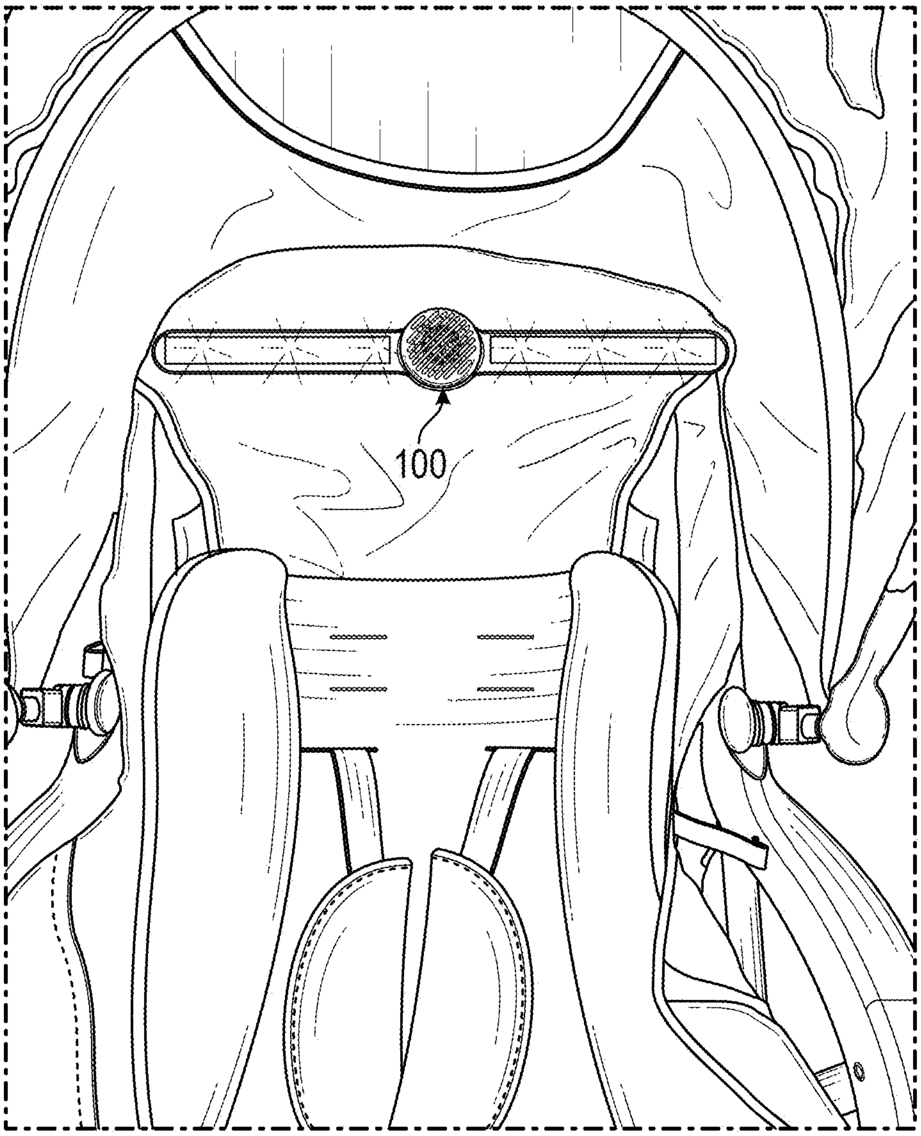
FIGS. 6A and 6B shows the device in use, demonstrating its placement within a stroller (FIG. 6A) and a crib (FIG. 6B).
Figure 6B:

Referring now to FIGS. 1-6B, the present invention features an illumination device (100; i.e., Lullaby Light) comprising a housing component (110) comprising a first side (111) and a second side (112), a first lighting source (121) disposed on the first side (111) at or near a first end (113) of the housing component (110), a second lighting source (122) disposed on the first side (111) at or near a second end (114) of the housing component (110), and a speaker (130) disposed centrally within the housing component (110). For example, the speaker (130) may be disposed centrally within the housing component (110) between the first lighting source (121) and the second lighting source (122).

In other embodiments, the illumination device (100) comprises a housing component (110) comprising a first side (111) and a second side (112), a first lighting source (121) disposed on the first side (111) at or near a first end (113) of the housing component (110), a second lighting source (122) disposed on the first side (111) at or near a second end (114) of the housing component (110), a speaker (130) disposed centrally within the housing component (110) between the first lighting source (121) and second lighting source (122), at least one power source operatively coupled to the first lighting source (121), the second lighting source (122), and the speaker (130); and one or more attachment components disposed on the second side (112) of the housing component (110).

In certain embodiments, the first lighting source (121) and the second lighting source (122) comprise light-emitting diodes (LEDs). In some embodiments, the first lighting source (121) and the second lighting source (122) are elongated in shape. Additionally, in some embodiments, the first lighting source (121) and the second lighting source (122) are arranged collinearly. Furthermore, in certain configurations, the first lighting source (121), the second lighting source (122), and the speaker (130) are oriented to face the same direction.

In certain embodiments, the housing component (110) is made of plastic. In some embodiments, the housing component (110) is made of wood. In other embodiments, the housing component (110) is made of composite materials.

In some embodiments, the housing component (110) is about 15 inches in length. In some embodiments, the housing component (110) is about 14.5 inches in length. In some embodiments, the housing component (110) is about 14 inches in length. In some embodiments, the housing component (110) is about 13.5 inches in length. In some embodiments, the housing component (110) is about 13 inches in length. In some embodiments, the housing component (110) is about 12 inches in length. In some embodiments, the housing component (110) is about 11 inches in length. In some embodiments, the housing component (110) is about 10 inches in length. In some embodiments, the housing component (110) is about 8 inches in length. In some embodiments, the housing component (110) is about 8 to 15 inches in length. In some embodiments, the housing component (110) is about 10 to 15 inches in length.

The housing component (110) of the present invention is not limited to the lengths described above. For example, in certain embodiments, the housing component (110) may be about 15 inches in length or greater, depending on the specific mounting requirements. In other embodiments, the housing component is designed with sufficient length to accommodate both a single lighting source, such as a first lighting source (121), and a speaker component (130).

In some embodiments, the housing component (110) is about 1 inch wide. In some embodiments, the housing component (110) is about 1.5 inches wide. In some embodiments, the housing component (110) is about 2 inches wide. In some embodiments, the housing component (110) is about 2.5 inches wide. In some embodiments, the housing component (110) is about 3 inches wide. In some embodiments, the housing component (110) is about 3 inches wide. In some embodiments, the housing component (110) is about 5 inches wide. In some embodiments, the housing component (110) is about 1.5 to 5 inches wide. In some embodiments, the housing component (110) is about 2 to 5 inches wide.

In certain embodiments, the width of the housing component (110) is approximately one-third of the interior width of the stroller. The specific width of the housing component (110) is determined by the height of the stroller seat, ensuring that the illumination device rests comfortably and securely above the child's head while seated in the stroller. Additionally, in some embodiments, the width of the housing component (110) is not restricted to the dimensions described above.

In some embodiments, the housing component (110) is about 1 inch in depth. In some embodiments, the housing component (110) is about 0.5 inches in depth. In some embodiments, the housing component (110) is about 1.5 inches in depth. In some embodiments, the housing component (110) is about 2 inches in depth. In some embodiments, the housing component (110) is about 2.5 inches in depth. In some embodiments, the housing component (110) is about 3 inches in depth. In some embodiments, the housing component (110) is about 0.5 to 3 inches in depth. In some embodiments, the housing component (110) is about 1 to 3 inches in depth. The depth of the housing component (110) is not restricted to the dimensions described above.

In some embodiments, the illumination device (100) may comprise a power source. In other embodiments, the illumination device (100) may comprise at least one power source; e.g., the illumination device (100) is powered by one or more replaceable or rechargeable batteries. For example, the illumination device (100) may include at least one power source operatively connected to the first lighting source (121), the second lighting source (122), or the speaker (130). In further embodiments, the illumination device (100) may comprise two power sources. For example, the first and second lighting sources (121, 122) may be powered by a first power source, and the speaker (130) may be powered by a second power source. Likewise, in some embodiments, the illumination device (100) may include a first power source operatively connected to the first lighting source (121) and the second lighting source (122), and a second power source operatively connected to the speaker (130). In some embodiments, the power source is one or more replaceable or rechargeable batteries. The batteries may be constructed using various compositions, such as alkaline or lithium iron disulfide, and can be designed with different end-user configurations, including permanent, user-replaceable, or non-user-replaceable options.

Alternatively, in some embodiments, the first and second lighting sources (121, 122) may be powered by a detachable battery pack. In some embodiments, the battery pack may take 3AA batteries.

In some embodiments, the illumination device (100) is rechargeable, including both the first and second lighting sources (121, 122) and the speaker (130). In some variations, only the first and second lighting sources (121, 122) are rechargeable, while in other embodiments, the speaker (130) is independently rechargeable. For example, the system (100) may be charged by a USBC.

In certain embodiments, the first and second lighting sources (121, 122) are powered by one or more replaceable batteries, and the speaker is powered by one or more rechargeable batteries. In other embodiments, the first and second lighting sources (121, 122) are powered by one or more rechargeable batteries, and the speaker is powered by one or more replaceable batteries.

In some embodiments, the power source(s) is integrated into the system. In other embodiments, the power source(s) is detached from the system, e.g., a detachable battery pack.

In some embodiments, the speaker (130) is 2.0 inches by 1.0 inches. In certain embodiments, the speaker (130) is a Bluetooth™-enabled device that can seamlessly pair with any electronic device equipped with a music application, allowing users to play their preferred audio selections. In some embodiments, the Bluetooth™ speaker features a bass boost, a waterproof built-in microphone, and an auto speaker setup.

In some embodiments, the illumination device (100) described herein further includes a remote. In some embodiments, the remote controls the first and second lighting sources (121, 122) and/or the speaker (130). In some embodiments, the remote is powered by one or more replaceable or rechargeable batteries. In some embodiments, the remote uses a CR2023 lithium battery. In certain embodiments, the first and second lighting sources (121, 122) feature multicolor and multi-sequence capabilities, with adjustable brightness controlled via the included remote.

In some embodiments, the illumination device further comprises one or more attachment components disposed on the second side (112) of the housing component (110). For example, the illumination device (100) may comprise two attachment components, where a first attachment component is disposed on the second side (112) at or near the first end (113) of the housing component (110) and a second attachment component is disposed on the second side (112) at or near a second end (114) of the housing component (110). In other embodiments, the illumination device (100) may comprise three attachment components, where a first attachment component is disposed on the second side (112) at or near the first end (113) of the housing component (110), a second attachment component is disposed on the second side (112) at or near a second end (114) of the housing component (110), and a third attachment component is on the second side (112) at or near the center of the housing component. In certain embodiments, the housing component (110) may comprise four attachment components, wherein two attachment components are disposed on the second side (112) at or near the first end (113) of the housing component (110) and another two attachment components are disposed on the second side (112) at or near a second end (114) of the housing component (110). The present invention is not restricted to the attachment component configurations described above and may encompass alternative designs to securely affix the illumination device to various types of baby gear.

In some embodiments, the attachment components comprise clips or hook-and-loop fasteners.

The illumination systems and devices described herein are designed to be lightweight and compact for ease of use. The device is removable, allowing for convenient charging or storage when not in use.

The devices described herein may be portable and may be attached to any surface that allows clips or velcro attachment. For example, the devices described herein may be attachable to a stroller, a crib, a wagon, a buggy, and even play areas for infants, children, and toddlers.

In some embodiments, the illumination devices (100) described herein is removably attachable to various types of baby gear, including cribs, bassinets, strollers, wagons or carts, and car seats.

In other embodiments, the present invention may feature an illumination system for baby gear. In some embodiments, the illumination system comprises a baby gear and an illumination device (100) as described herein removably attached to the baby gear. Non-limiting examples of baby gear to which the illumination device may be removably attached include but are not limited to, cribs, bassinets, strollers, wagons or carts, and car seats.

As used herein, the term "about" refers to plus or minus 10% of the referenced number.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting essentially of" or "consisting of", and as such the written description requirement for claiming one or more embodiments of the present invention using the phrase "consisting essentially of" or "consisting of" is met.

Reference numbers recited herein, in the drawings, and in the claims are solely for ease of examination of this patent application and are exemplary. The reference numbers are not intended in any way to limit the scope of the claims to the particular features having the corresponding reference numbers in the drawings.

What is claimed is:

1. An illumination device (100) comprising:

a) a housing component (110) comprising a first side (111) and a second side (112) opposite the first side (111);

b) a first lighting source (121) disposed on the first side (111) at or near a first end (113) of the housing component (110), wherein the first lighting source (121) is elongated, extending along the housing component (110) from a central region of the housing component (110) toward the first end (113);

c) a second lighting source (122) disposed on the first side (111) at or near a second end (114) of the housing component (110), wherein the second lighting source (122) is elongated, extending along the housing component (110) from a central region of the housing component (110) toward the second end (114); and d) a speaker (130) disposed centrally within the housing component (110) between the first lighting source (121) and the second lighting source (122);

wherein the first lighting source (121) and the second lighting source (122) are collinear.

2. The illumination device (100) of claim 1, further comprising one or more attachment components disposed on the second side (112) of the housing component (110).

3. The illumination device (100) of claim 2, wherein the attachment components comprise clips or hook and loop fasteners.

4. The illumination device (100) of claim 1, further comprising at least one power source operatively coupled to the first lighting source (121), the second lighting source (122), and the speaker (130).

5. The illumination device (100) of claim 4, wherein the power source comprises a replaceable or rechargeable battery.

6. The illumination device (100) of claim 1, wherein the illumination device (100) is removably attachable to a crib or a stroller.

7. The illumination device (100) of claim 1, wherein the first lighting source (121) and second lighting source (122) comprise light emitting diodes (LEDs).

8. The illumination device (100) of claim 1, wherein the first lighting source (121), the second lighting source (122), and the speaker (130) face in a same direction.

9. An illumination device (100) comprising:

a) a housing component (110) comprising a first side (111) and a second side (112) opposite the first side (111);

b) a first lighting source (121) disposed on the first side (111) at or near a first end (113) of the housing component (110), wherein the first lighting source (121) is elongated, extending along the housing component (110) from a central region of the housing component (110) toward the first end (113);

c) a second lighting source (122) disposed on the first side (111) at or near a second end (114) of the housing component (110), wherein the second lighting source (122) is elongated, extending along the housing component (110) from a central region of the housing component (110) toward the second end (114);

d) a speaker (130) disposed centrally within the housing component (110) between the first lighting source (121) and the second lighting source (122);

e) at least one power source operatively coupled to the first lighting source (121), the second lighting source (122), or the speaker (130); and f) one or more attachment components disposed on the second side (112) of the housing component (110), wherein the one or more attachment components are configured to be removably attached to baby gear;

wherein the first lighting source (121) and the second lighting source (122) are collinear.

10. The illumination device (100) of claim 9, wherein the first lighting source (121), the second lighting source (122), and the speaker (130) face in a same direction.

11. An illumination system for baby gear, comprising:

a) a baby gear; and b) an illumination device (100) removably attached to the baby gear, the illumination device (100) comprising:

i. a housing component (110) comprising a first side (111) and a second side (112) opposite the first side;

ii. a first lighting source (121) disposed on the first side (111) at or near a first end (113) of the housing component (110), wherein the first lighting source (121) is elongated, extending along the housing component (110) from a central region of the housing component (110) toward the first end (113);

iii. a second lighting source (122) disposed on the first side (111) at or near a second end (114) of the housing component (110), wherein the second lighting source (122) is elongated, extending along the housing component (110) from a central region of the housing component (110) toward the second end (114);

iv. a speaker (130) disposed centrally within the housing component (110) between the first lighting source (121) and the second lighting source (122);

v. at least one power source operatively coupled to the first lighting source (121), the second lighting source (122), and the speaker (130); and vi. one or more attachment components disposed on the second side (112) of the housing component (110), wherein the one or more attachment components are configured to be removably attached to the baby gear;

wherein the first lighting source (121) and the second lighting source (122) are collinear.

12. The illumination system of claim 11, wherein the baby gear is a crib, a bassinet, a stroller, a wagon or cart, or a carseat.

13. The illumination device (100) of claim 11, wherein the first lighting source (121), the second lighting source (122), and the speaker (130) face in a same direction.

* * * * *